(12) United States Patent
Hannemann et al.

(10) Patent No.: US 6,182,700 B1
(45) Date of Patent: Feb. 6, 2001

(54) DIVERTER VALVE

(75) Inventors: Fred Hannemann, Herzberg; Roland Weiss, Iserlohn, both of (DE)

(73) Assignee: Friedrich Grohe AG & Co. KG, Hemer (DE)

( * ) Notice: Under 35 U.S.C. 154(b), the term of this patent shall be extended for 0 days.

(21) Appl. No.: 09/590,352

(22) Filed: Jun. 8, 2000

(30) Foreign Application Priority Data

Jun. 16, 1999 (DE) .............................................. 199 27 377

(51) Int. Cl.$^7$ ................................................. F16K 11/044
(52) U.S. Cl. ............................................. 137/881; 137/872
(58) Field of Search .................................... 137/872, 881, 137/861, 862

(56) References Cited

U.S. PATENT DOCUMENTS

| | | | |
|---|---|---|---|
| 3,974,861 | * | 8/1976 | Goto et al. ............................ 137/872 |
| 4,129,150 | * | 12/1978 | Boisserand ........................... 137/872 |
| 4,989,640 | * | 2/1991 | Steffes et al. ..................... 137/872 X |
| 5,141,016 | * | 8/1992 | Nowicki ............................ 137/872 X |
| 5,549,136 | * | 8/1996 | Drocco et al. ....................... 137/872 |
| 6,082,624 | * | 7/2000 | Heinzelmann et al. ............ 37/872 X |

FOREIGN PATENT DOCUMENTS 43 23 496    1/1995   (DE) .

* cited by examiner

Primary Examiner—Kevin Lee
(74) Attorney, Agent, or Firm—Herbert Dubno; Andrew Wilford

(57) ABSTRACT

A valve assembly has a valve housing formed with a bore open at a surface and extending along an axis, an inlet passage opening into the bore, inner and outer outlet passages also opening into the bore, and an inner valve seat between the inlet passage and the inner outlet passage. A sleeve fitted in the bore forms an outer valve seat between the inlet passage and the outer outlet passage and a valve body is displaceable in the bore between an inner position against the inner seat and blocking flow from the inlet passage to the inner outlet passage and an outer position against the outer seat and blocking flow from the inlet passage to the outer outlet passage. A retaining disk fitted in the bore between the outer surface and the sleeve secures the sleeve in the bore. A stem extending through the sleeve and through the disk has an inner end connected to the valve body and an outer end outside the valve housing. Seals are provided between the sleeve and the stem.

11 Claims, 2 Drawing Sheets

DIVERTER VALVE

FIELD OF THE INVENTION

The present invention relates to a diverter valve. More particularly this invention concerns such a valve used to direct flow, for instance from a mixing valve, to either of two users, for instance a faucet and a shower.

BACKGROUND OF THE INVENTION

It is standard to provide a mixing valve used in a bathtub with a diverter valve so that the output of the mixing valve can be fed either to the faucet or to the shower. Such a valve is normally set up so that, if set to divert flow to the shower, once the pressure is relieved it resets to divert flow to the faucet.

The standard such valve assembly as described in German patent document 4,323,496 of W. Gnauert. it has a valve housing formed with a bore open at a surface and extending along an axis, an inlet passage opening into the bore, inner and outer outlet passages also opening into the bore, and an inner valve seat between the inlet passage and the inner outlet passage. The inlet passage is itself supplied with water from a mixing valve connected to hot- and cold-water lines. A sleeve fitted in the bore forms an outer valve seat between the inlet passage and the outer outlet passage. A valve body is displaceable in the bore between an inner position against the inner seat and blocking flow from the inlet passage to the inner outlet passage and an outer position against the outer seat and blocking flow from the inlet passage to the outer outlet passage. Normally a faucet is connected to one of the outlet passages and a shower to the other.

This structure is fairly bulky and unattractive. The complex diverter valve projects from the valve housing considerably. Furthermore mounting the diverter-valve parts on the main valve is fairly complex.

OBJECTS OF THE INVENTION

It is therefore an object of the present invention to provide an improved valve assembly with a diverter valve.

Another object is the provision of such an improved valve assembly with a diverter valve which overcomes the above-given disadvantages, that is which is of extremely compact construction and that can be incorporated neatly and easily into a standard mixing valve.

SUMMARY OF THE INVENTION

A valve assembly has according to the invention a valve housing formed with a bore open at a surface and extending along an axis, an inlet passage opening into the bore, inner and outer outlet passages also opening into the bore, and an inner valve seat between the inlet passage and the inner outlet passage. A sleeve fitted in the bore forms an outer valve seat between the inlet passage and the outer outlet passage and a valve body is displaceable in the bore between an inner position against the inner seat and blocking flow from the inlet passage to the inner outlet passage and an outer position against the outer seat and blocking flow from the inlet passage to the outer outlet passage. According to the invention a retaining disk fitted in the bore between the outer surface and the sleeve retains the sleeve in the bore. A stem extending through the sleeve and through the disk has an inner end connected to the valve body and an outer end outside the valve housing. Seals are provided between the sleeve and the stem.

Thus with this system the diverter valve is wholly incorporated in the housing of the mixing valve. All that projects externally is the outer end of the actuating stem.

A simple radially extending screw threaded into the housing serves for fixing the sleeve in place. The sleeve, body, disk, stem, and seals form a subassembly that is thus mounted in the mixing valve by means of this single screw.

The sleeve according to the invention is formed with an axially outwardly open groove surrounding the stem and the disk has an inner face directed bearing axially inward toward the sleeve. The seals include a seal ring set in the groove and bearing axially outward on the inner disk face. This seal ring is compressible and has when not compressed a diameter greater than an axial depth of the groove. Thus it can compensate for a loose axial fit of the sleeve in the bore. The bore is formed with an axially outwardly directed shoulder and the sleeve has a radially outwardly projecting flange pressed by the disk against the shoulder.

The disk according to the invention is formed around the stem with a radially outwardly open groove and the stem has a large-diameter shaft fitting snugly but axially slidably in the groove and provided with a handle. The assembly further has according to the invention a spring in the groove, surrounding the stem, and braced axially between the disk and the shaft.

The sleeve is molded plastic and the disk is of stainless steel. Furthermore the disk has an outer face flush with the housing outer face and the outer faces are coated.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
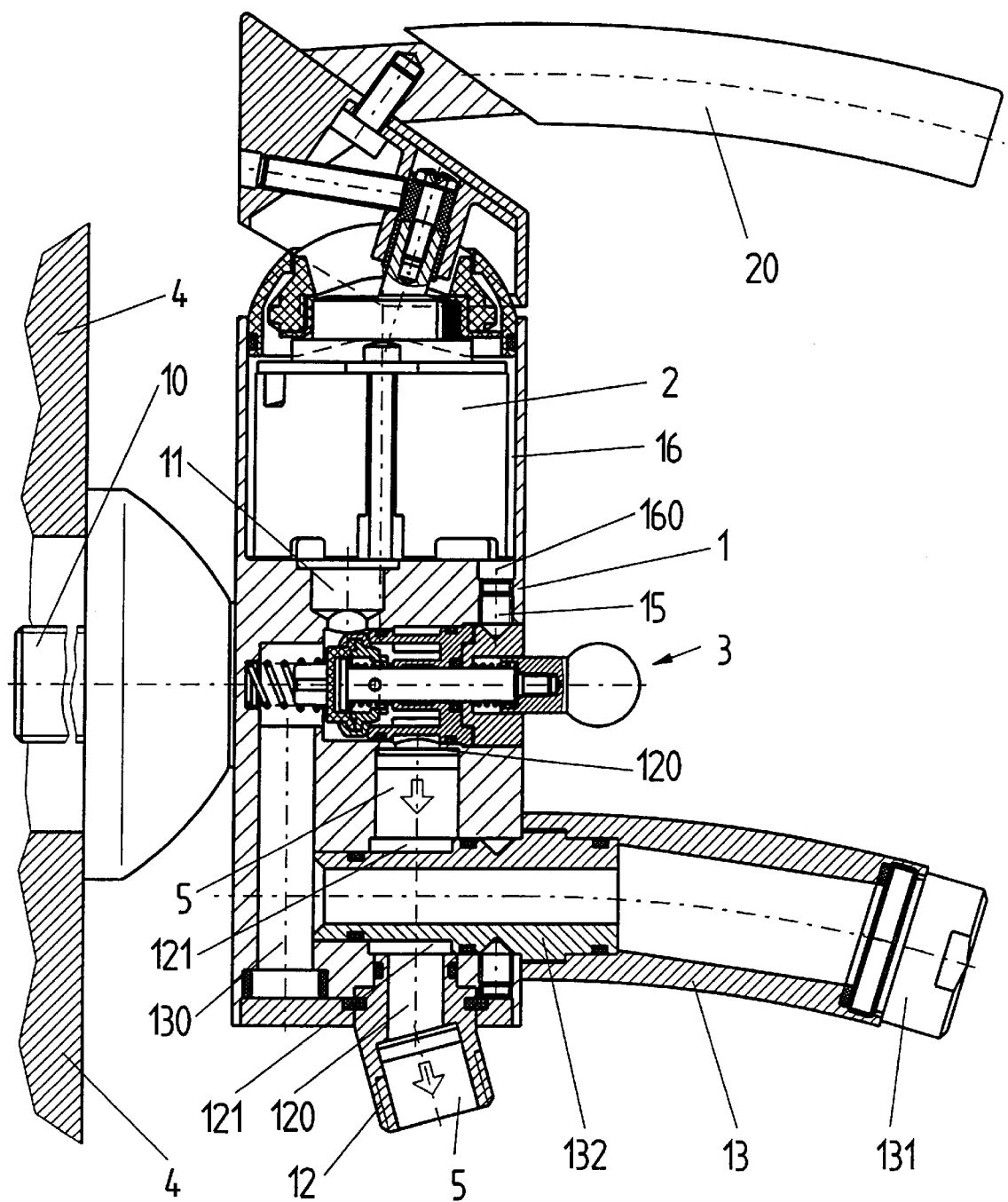
FIG. 1 is a vertical section through a faucet assembly with the diverter valve according to the invention.

As seen in FIG. 1 a valve housing 1 is mounted on a vertical wall 4 and connected to hot- and cold-water supply lines 10 (only one shown) that are in turn connected via unillustrated passages in the housing 1 to a valve cartridge 2. A lever 20 on the cartridge 2 controls the rate of flow from the two inputs 10 to a passage or port 11 formed in the body 1. The flow is thence sent by a diverter valve 3 described in detail below either to a passage 120 provided with two backflow preventers 5 to an outlet 12 to which is normally connected the hose of a hand shower or to a default passage 130 that opens into the rear end of a faucet 13 having an aerator 131. The passage 120 extends via a groove 121 around a sleeve 132 forming an inward extension in the housing 1 of the faucet 13. This construction is all generally standard.

The valve housing 1 is formed with a stepped cylindrical bore 14 centered on an axis A and into which the passages 11, 130 and 120 open. A valve body 30 is axially displaceable in this bore 14 between an inner position on a seat 32 and an outer position on a seat 31. In the inner position flow from the inlet passage 11 to the outlet passage 130 is blocked and flow from the inlet passage 11 to the outlet passage 120 is permitted and in the outer position the passage 130 is open and the passage 120 is blocked.

The outer seat 31 is formed on the inner end of a molded plastic sleeve 33 fitted in the bore 14 and provided with seals 332 to both sides of the outlet port 120 and with orifices 333 between these seals. This sleeve 33 has an outer end flange 331 resting on an outwardly directed shoulder 140 of the bore 14 and is held in place thereon by a stainless-steel retaining element or disk 35 that bears on an outer face of the sleeve 35. A set screw 15 secures this disk 35 in place flush with an outer face 111 of the body 1.

An actuating stem or rod 34 is limitedly axially slidable in the sleeve 33 and in the valve body 30, passing through the sleeve 33 and through a central hole 351 in the disk 35. This stem 34 is surrounded at the outer end of the sleeve 33 by a seal ring 36 set in an outwardly open groove 330 of the sleeve, which groove 330 is axially outwardly closed by the inner face 350 of the disk 35. The inner end of the stem 34 has a head 353 that is limitedly axially displaceable in the body 31. The outer end of the stem 34 is formed with a screw 39 threaded into a shaft 341 of a ball knob 340. The disk 35 is formed with a cylindrical recess 352 in which the cylindrical shaft 348 is axially slidable. The outer face of the disk 35 and the ball knob 340 and its shaft 341 are externally finished to match the valve.

A spring 37' is braced between the inner-end head 353 of the stem 34 and the sleeve 33 to urge the stem 34 axially inward (to the left in FIG. 2) and another such spring 37" of the same spring force surrounds the stem 34 in the recess 352 and is braced between the disk 34 and the ball shaft 341 to urge the stem 34 axially outward. A somewhat heavier spring 38 is braced against the bottom of the bore 14 and is fitted over a projection 331 on the inner end of the valve body 31 to urge the valve body outward toward the seat 31.

Figure 2:
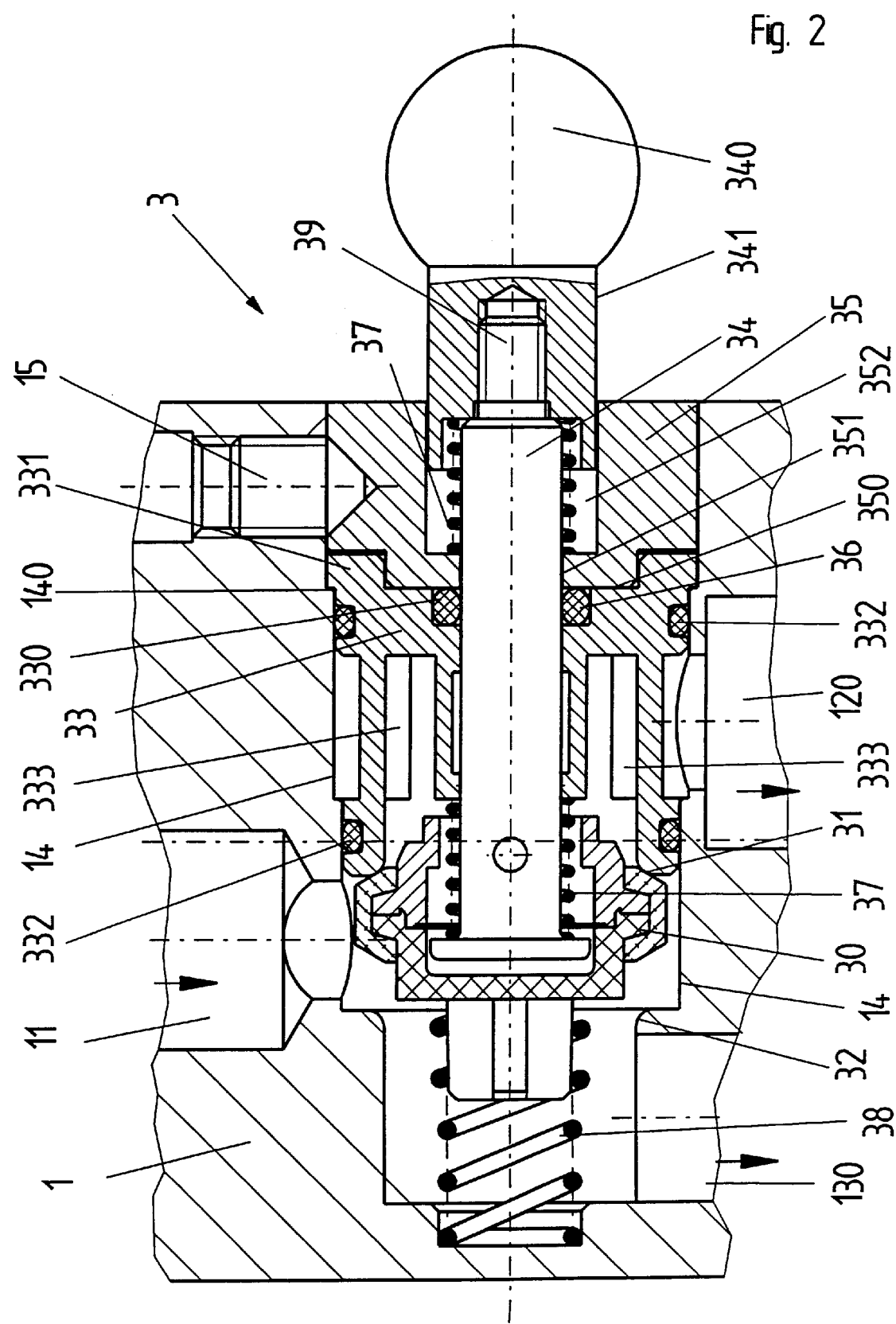
FIG. 2 is a large-scale axial section through the diverter valve of FIG. 1.

FIG. 2 shows the rest position of the system. If water under pressure is fed to the inlet passage 11 of the valve 3 it will therefore flow back in the bore 14 and out the passage 13 to exit through the faucet 13. Flow to a shower connected to the nipple 12 will be blocked since the spring 38 will be holding the valve body 33 against the outer seat 31.

If the ball 340 is momentarily pressed, the valve body 33 will be moved backward off the seat 31 and will come to rest against the seat 32. This action will block flow out through the passage 130 and will allow flow from the inlet passage 11 through the sleeve and its orifices 33 to the outlet passage 120 and thence to the shower connection 12. Release of the knob 340 will allow it to return to the FIG. 2 position, but the pressure n the bore 14 outward of the valve body 31 will hold it against the force of the spring 38 on the seat 32.

From this position if the ball 340 is pulled outward, this action will lift the valve body 31 off the inner seat 32 and the combined action of the pressure in the bore 14 inward of the body 31 and the spring 38 will push this body 31 outward to engage the seat 31, returning the system to the FIG. 2 rest position. Furthermore if flow is being diverted to the shower connection 12 and the cartridge 2 is actuated by its handle 20 to shut off flow into the passage 11, there will be no pressure to retain the body 31 against the seat 32 against the force of the spring 38 and the system will return to the FIG. 2 position.

Thus under normal circumstances flow will be directed to the faucet 13. A simple push on the ball 340 will divert this flow to the shower connection 12, but a pull on the ball 340 or shutting-off flow altogether will return flow to the faucet 13.

The entire diverter valve 3 can be installed in the housing as a single piece. It is simply pushed into the bore 14 until the disk outer face 353 is flush with the housing outer face 11, and then the set screw 15 is screwed home to lock it in position. The seal 36 is made slightly oversize, that is so it projects outward from the groove 330, so that when compressed it holds the sleeve 33 tight.

We claim:

1. A valve assembly comprising:

a valve housing formed with
   a bore open in an outer surface and extending along an axis,
   an inlet passage opening into the bore,
   inner and outer outlet passages also opening into the bore, and
   an inner valve seat between the inlet passage and the inner outlet passage;

a sleeve fitted in the bore and forming an outer valve seat between the inlet passage and the outer outlet passage;

a valve body displaceable in the bore between an inner position against the inner seat and blocking flow from the inlet passage to the inner outlet passage and an outer position against the outer seat and blocking flow from the inlet passage to the outer outlet passage;

a retaining disk fitted in the bore between the outer surface and the sleeve and retaining the sleeve in the bore;

means fixing the disk in the bore;

a stem extending through the sleeve and through the disk and having an inner end connected to the valve body and an outer end outside the valve housing; and seals between the sleeve and the stem.

2. The valve assembly defined in claim 1 wherein the fixing means is a radially extending screw threaded into the housing.

3. The valve assembly defined in claim 1 wherein the sleeve is formed with an axially outwardly open groove surrounding the stem and the disk has an inner face directed bearing axially inward toward the sleeve, the seals including a seal ring set in the groove and bearing axially outward on the inner disk face.

4. The valve assembly defined in claim 3 wherein the seal ring is compressible and has when not compressed a diameter greater than an axial depth of the groove.

5. The valve assembly defined in claim 1 wherein the bore is formed with an axially outwardly directed shoulder and the sleeve has a radially outwardly projecting flange pressed by the disk against the shoulder.

6. The valve assembly defined in claim 1 wherein the disk is formed around the stem with a radially outwardly open groove and the stem has a large-diameter shaft fitting snugly in the groove and provided with a handle, the assembly further comprising
   a spring in the groove, surrounding the stem, and braced axially between the disk and the shaft.

7. The valve assembly defined in claim 1 wherein the sleeve is molded plastic.

8. The valve assembly defined in claim 1 wherein the disk has an outer face flush with the housing outer surface.

9. The valve assembly defined in claim 1 wherein the outer faces are coated.

10. The valve assembly defined in claim 1 wherein the disk is stainless steel.

11. The valve assembly defined in claim 1 wherein the sleeve, body, disk, stem, and seals form a subassembly.

* * * * *